United States Patent [19]

Williams

[11] Patent Number: 5,295,074
[45] Date of Patent: Mar. 15, 1994

[54] VEHICLE SUSPENSION CONTROL SYSTEM

[75] Inventor: David A. Williams, Milton Keynes, United Kingdom

[73] Assignee: Group Lotus plc, Norfolk, United Kingdom

[21] Appl. No.: 777,231

[22] PCT Filed: May 4, 1990

[86] PCT No.: PCT/GB90/00690

§ 371 Date: Dec. 19, 1991

§ 102(e) Date: Dec. 19, 1991

[87] PCT Pub. No.: WO90/13448

PCT Pub. Date: Nov. 15, 1990

[30] Foreign Application Priority Data

May 5, 1989 [GB] United Kingdom ............... 8910392

[51] Int. Cl.$^5$ .............................................. B60G 17/01
[52] U.S. Cl. ............................ 364/424.05; 280/707; 280/840
[58] Field of Search ................. 364/424.05; 280/707, 280/840, 772

[56] References Cited

U.S. PATENT DOCUMENTS

| | | | |
|---|---|---|---|
| 4,761,022 | 8/1988 | Ohashi et al. | 280/772 |
| 4,898,257 | 2/1990 | Brandstadter | 280/707 |
| 4,907,154 | 3/1990 | Yasuda et al. | 364/424.05 |
| 4,967,359 | 10/1990 | Sugasawa et al. | 364/424.05 |
| 5,046,008 | 9/1991 | Dieter | 364/424.05 |
| 5,071,157 | 12/1991 | Majeed | 280/707 |
| 5,119,297 | 6/1992 | Buma et al. | 364/424.05 |

FOREIGN PATENT DOCUMENTS

| | | |
|---|---|---|
| 0114757A1 | 8/1984 | European Pat. Off. . |
| 0151421A3 | 8/1985 | European Pat. Off. . |
| 0249227A2 | 12/1987 | European Pat. Off. . |
| 60-50013 | 3/1985 | Japan . |
| 62-221906 | 9/1987 | Japan . |

Primary Examiner—Gary Chin
Attorney, Agent, or Firm—Westman, Champlin & Kelly

[57] ABSTRACT

A vehicle suspension control system comprises an actuator device for connection between a sprung mass of a vehicle and unsprung masses of the vehicle. A suspension system further comprises a device for determining forces acting between the sprung mass and the unsprung masses and for producing signals proportional to said forces, the device for determining forces comprising a first sensor device operable to produce a first set of signals comprising signals indicative of the loads in load paths between the unsprung masses and the sprung mass and a second sensor device operable to produce a second set of signals which includes signals indicative of the lateral acceleration of the vehicle, the longitudinal acceleration of the vehicle, and the yaw rate of the vehicle; a device for processing the second set of signals to produce steady state force signals indicative of steady state input loads on the vehicle including loads arising from cornering and acceleration/deceleration of the vehicle and loads carried by the vehicle; a device for combining the steady state force signals with the first set of signals to produce dynamic force signals indicative of dynamic inputs to the vehicle, the dynamic inputs including forces arising due to purgibations on a road below the vehicle. The control system further includes a first device for processing the steady state force signals to produce first control signals for controlling the actuator device, or by the first control signals act to control the actuator device to maintain the orientation of the sprung mass relative to a reference plane constant throughout vehicle cornering and acceleration/deceleration and constant with changing interior loads; and a second device for processing the dynamic force signals to produce second control signals for controlling the actuator means, whereby the second control signals act to control the actuator device to substantially eliminate the transmission of dynamic forces from the unsprung masses to the sprung mass.

12 Claims, 3 Drawing Sheets

VEHICLE SUSPENSION CONTROL SYSTEM

BACKGROUND OF THE INVENTION

This invention relates to a vehicle suspension control system. By "vehicle" is meant all classes of vehicle capable of motion on land, and the term includes motor vehicles, lorry cabs and trailers, tractors and tracked vehicles.

In particular, the invention relates to a vehicle suspension control system for controlling the suspension of a vehicle having an active suspension system.

Active suspension systems are well known. For example, our European Patent Application No. EP-A-0114757 discloses an active suspension system in which a number of sensor inputs representing variables of vehicle motion are processed in a microprocessor to produce signals representing forces required at the points of support of the vehicle body on its wheel/hub assemblies. The required forces are applied by respective hydraulic actuators disposed between the vehicle body and each wheel/hub assembly to maintain as nearly as possible a constant attitude of the vehicle.

Active suspension systems operate on the principles either of measuring the forces acting between the vehicle body and the wheel/hub assemblies or of calculating such forces from measured values indicative of vehicle behaviour.

The main problem faced by the designer of an active suspension system is the difficulty that whilst the vehicle suspension system should respond to perturbations in the road (dynamic inputs) by moving the actuators attached to the wheel and hub assembly, the suspension system should not cause the actuators to deflect in response to loads imposed upon the vehicle by reason of "steady state inputs". "Steady state inputs" include loads being placed on the suspension due to the cornering and acceleration/deacceleration of the vehicle. "Steady state input" also include variations on the load of the vehicle due to load carried inside the vehicle and aerodynamic forces on the vehicle. Such "steady state inputs" should generally not cause displacement of the actuators. In other words, the designer is faced with the problem of designing a suspension system which is "soft" to road input whilst being "hard" to steady state inputs.

SUMMARY OF THE INVENTION

According to the invention, there is provided a vehicle suspension control system comprising:
  means for determining forces acting between the sprung mass of said vehicle and one or more unsprung masses connected thereto and producing signals proportional to said forces;
  means for resolving said force signals to represent steady state and dynamic force components respectively;
  first means for determining, from the steady state force signals, values of vector quantities required between the sprung mass and the or each unsprung mass to maintain a constant orientation of said sprung mass relative to a reference plane;
  second means for determining, from the dynamic force signals, values of vector quantities required between the sprung mass and the or each unsprung mass substantially to eliminate the transmission of dynamic forces between the sprung mass and the or each unsprung mass; and
  means for applying said required vector quantities.

BRIEF DESCRIPTION OF THE DRAWING

There now follows a description of a specific embodiment of the invention, by way of example, with reference being made to the accompanying drawings in which.

DETAILED DESCRIPTION OF THE PREFERRED EMBODIMENTS

Figure 1:
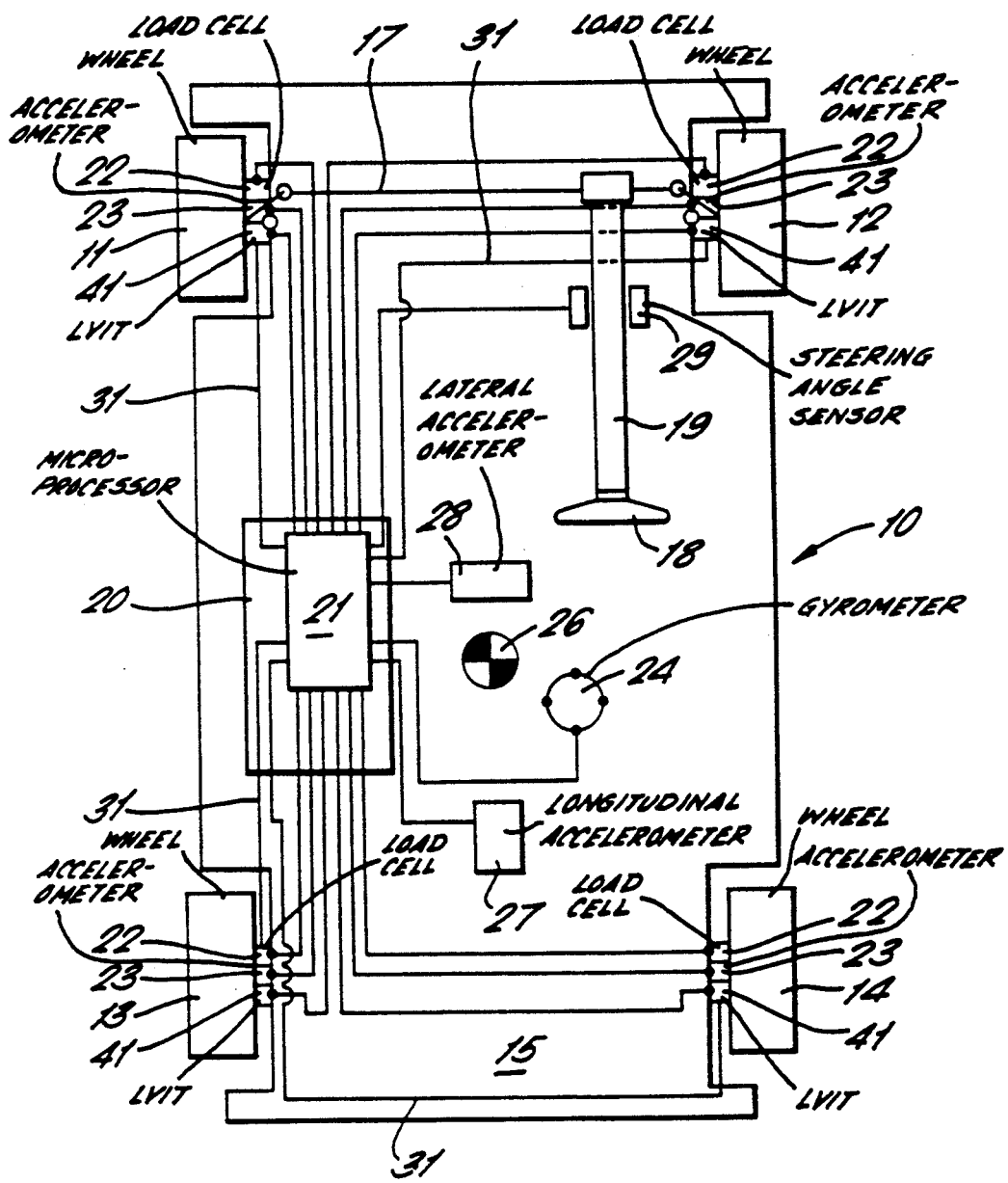
FIG. 1 is a schematic plan representation of a motor vehicle having a control system according to the invention.

Referring to FIG. 1 there is shown a motor vehicle 10 having four wheels 11, 12, 13, 14. The motor Vehicle 10 has a body 15 and the wheels 11, 12, 13, 14 are connected to the body 15 by suspension and steering or drive components (not shown in detail). The suspension components are described below in relation to FIG. 2.

The front wheels 11 and 12 of the vehicle 10 are steerable, and the vehicle has a conventional steering linkage 17 driven by steering wheel 18 via steering column 19.

The vehicle 10 of FIG. 1 has an on-board computer 20 incorporating a microprocessor 21. Microprocessor 21 receives signals from a number of sensors distributed about the vehicle and controls the suspension of the vehicle 10 in response to the signals.

Each wheel and its associated hub assembly has three transducers capable of sending signals to microprocessor 21, these transducers being load cells 22, accelerometers 23 and displacement transducers.

The load cells 22 respectively measure the load acting between the top of each suspension strut 30 (best shown in FIG. 2) and the vehicle body 15. The accelerometers 23 measure the respective vertical accelerations of the wheel/hub assemblies.

The forces transmitted via the load cells 22 and calculated from the accelerometer measurements are the dynamic forces acting on the vehicle body 15, and are occasioned, for example by the vehicle 10 encountering variations in the road surface along which it travels. The load cells 22, accelerometers 23 and microprocessor 21 therefore constitute means for determining forces acting between the sprung mass (i.e. body 15) of the vehicle and one or more unsprung masses (i.e. the wheel/hub assemblies) and producing signals proportional to the forces. The load cells 22, accelerometers 23 and microprocessor 21 also constitute means for resolving the dynamic force components.

The microprocessor 21 also receives signals from further transducers which signals are processed in the microprocessor 21 to represent steady state forces acting between the vehicle body 15 and each wheel/hub assembly.

A gyrometer 24 located near the vehicle center of gravity indicated by reference numeral 26 measures the yaw rate (i.e. rotational velocity) of the vehicle 10. Signals are generated by the gyrometer 24 when, for example, the vehicle follows a curved path.

A longitudinal accelerometer 27 indicates, for example, the extent to which the vehicle is accelerating and braking.

A lateral accelerometer 28 measures the vehicle lateral acceleration. The lateral accelerometer is also adjacent the vehicle center of gravity 26 and indicates, for example, the lateral acceleration effects of the vehicle travelling around a curve, and of the lateral component of gravitational acceleration when the vehicle 10 is on a cambered road.

A steering angle sensor 29 located in the embodiment of FIG. 1 on the steering column 19 measures the angle $\beta$ through which the steering wheel is turned. The steering angle sensor could be located in one of a variety of positions, for instance a suitable transducer could be included in the steering linkage 17 or on one of the front wheel/hub assemblies.

The transducers 24, 27, 28 and 29 in combination with microprocessor 21 constitute further means for determining forces acting between the sprung mass (i.e. the vehicle body 15) of the vehicle 10 and one or more unsprung masses (i.e. the wheel/hub assemblies) and producing signals proportional to the forces; and also constitute means for resolving the steady state components of the forces.

The steady state forces acting between the vehicle body 15 and the wheel/hub assemblies are therefore those occasioned by the condition of the vehicle as determined by the driver thereof, for example whether the vehicle is decelerating being one such condition.

The microprocessor 21 is capable of determining, from the steady state force values, vector quantities in the form of velocities required between the sprung mass (i.e. the vehicle body 15) and the unsprung masses (i.e. the wheel/hub assemblies) to maintain a constant orientation of the vehicle body relative to a predetermined reference plane.

The microprocessor 21 is also capable of determining from the dynamic force values the values of vector quantities in the form of velocities required between the body 15 and the wheel/hub assemblies to eliminate the transmission of dynamic forces therebetween.

The required velocities are transmitted as electrical signals to the wheel/hub assemblies via output lines 31 where actuators 32 incorporated within the suspension struts operate to apply the required velocities between each wheel/hub assembly and the vehicle body 15.

Figure 2:
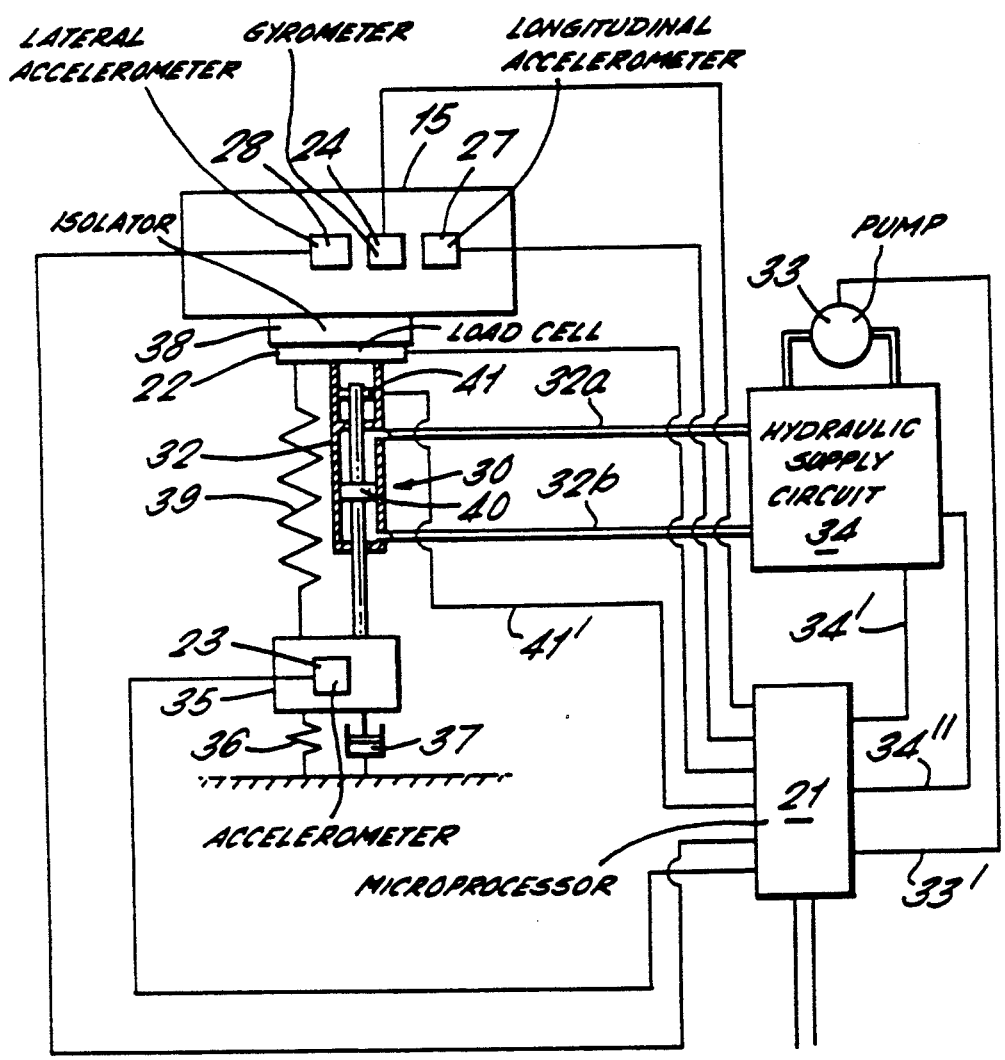
FIG. 2 is a schematic elevational view of one corner of the vehicle of FIG. 1.

FIG. 2 shows schematically the arrangement of components forming the suspension strut associated with one corner of the vehicle 10. Also shown in FIG. 2 is the arrangement of the pump 33 and hydraulic supply circuit for the actuator 32 shown therein. Clearly, the circuit shown in FIG. 2 represents one quarter of the circuitry for the entire vehicle 10, and whilst the pump 33, hydraulic control circuit 32 and microprocessor 21 are common to all four suspension assemblies of the vehicle, the electrical control lines between the suspension assembly and the microprocessor 21; the hydraulic supply and return lines 36 and 37; and the suspension strut 30 are reproduced for the three suspension assemblies not shown in FIG. 2.

In FIG. 2, the sprung mass of the vehicle in the form of the vehicle body 15 is shown supported on a suspension strut indicated generally by the reference sign 30, which are in turn supported on a wheel and tire modelled as an unsprung mass 35 in the form of the wheel/hub assembly supported on a spring 36 and damper 37 representing the tire.

The suspension components 30 comprise means for applying vector quantities in the form of velocities to control the attitude of the vehicle, in the form of an hydraulic actuator 32, shown vertically aligned and secured at its upper end to a load cell 22 which is separated from the vehicle body 15 by an isolator 38, which may be, for example, a rubber block. The actuator 32 need not necessarily be vertically alinged, depending on the space available for suspension components and the suspension layout adopted. The load cell 22 is capable of measuring at least a portion of the loads acting between the wheel/hub assembly and the vehicle body and producing signals proportional to the loads.

A spring 39 is shown connected in parallel with the hydraulic actuator 32.

The spring 39 does not control the attitude of the vehicle in the way that it would in a vehicle having a conventional suspension system. Spring 39 serves merely to reduce the power consumption of the control system of the invention by bearing a significant proportion of the static load of the vehicle body 15.

Thus, the operation of actuator 32 may take place over a wide range of displacements actually to effect control of the vehicle without requiring an excessive power consumption as would normally be required if the actuator were to support the static load of the vehicle body 15 in addition to controlling the steady state and dynamic loadings resulting from dynamic and steady state forces acting on the vehicle.

The actuator 32 is preferably a double-acting electro-hydraulic actuator comprising a sealed cylinder, a piston attached to a connecting rod and a flow control valve. The sealed cylinder is capable of containing high pressure fluids without significant leakage. The piston is attached to a connecting rod and is housed within the cylinder. The piston device is cylindered in to two chambers. The piston is fitted with seals to prevent significant leakage from one chamber to another.

The hydraulic circuit 34 preferably comprises a four port control valve, or electro-hydraulic servo valve (EHSV), which has two input and two output ports. One input port is connected to a source of high pressure hydraulic fluid, the other input port is connected to a return path which is held at low pressure. The EHSV is designed such that when an electric current is passed through its energising coil, hydraulic fluid is allowed to flow from the high pressure source in to one cylinder chamber of the actuator 32, whilst fluid is allowed to flow from the other chamber of the actuator 32 in to the return path. This causes the piston to move relative to the cylinder with a velocity proportional to the electric current applied to the energising coil and the load reacted by the differential pressure across the piston. When the plurality of the current is reversed the velocity of the piston is reversed. If the EHSV conforms to the ideal, then the velocity of the piston will be zero when the electrical current applied to the energising coil is zero.

Since the power consumption of actuator 32 is reduced, by the use of spring 39, its piston area may be designed to be relatively small, thereby producing a compact device. Further, spring 39 serves as a fail-safe device in that it supports the static load of the vehicle body 15 in the event of total failure of the control system of the invention.

The input and output ports of the hydraulic actuator 32 are connected via hydraulic pipework 32a and 32b to a hydraulic control circuit 34 including a suitable supply pump 33. The hydraulic circuit 34 operates, via electrical connection 34', under the command of microprocessor 21 which produces a demanded output of the actuator 32 in response to the number of measured inputs.

The suspension strut 30 and hydraulic circuit 34 therefore constitute means for applying required vector quantities between the vehicle body 15 and the wheel/hub assembly in the form of unsprung mass 35.

Electrical signals monitoring the hydraulic system pressure and, where appropriate, the pump swash plate angle may optionally be fed into microprocessor 21 via lines 34'' and 33'. Further, the position of actuator 32 is measured by Linear Variable Inductive Transducer (LVIT) 41 and fed via line 41' to microprocessor 21.

Clearly, alternatives to the kinds of transducer, pump and actuator described herein may be used in the embodiment of FIGS. 1 and 2 if required.

Figure 3:
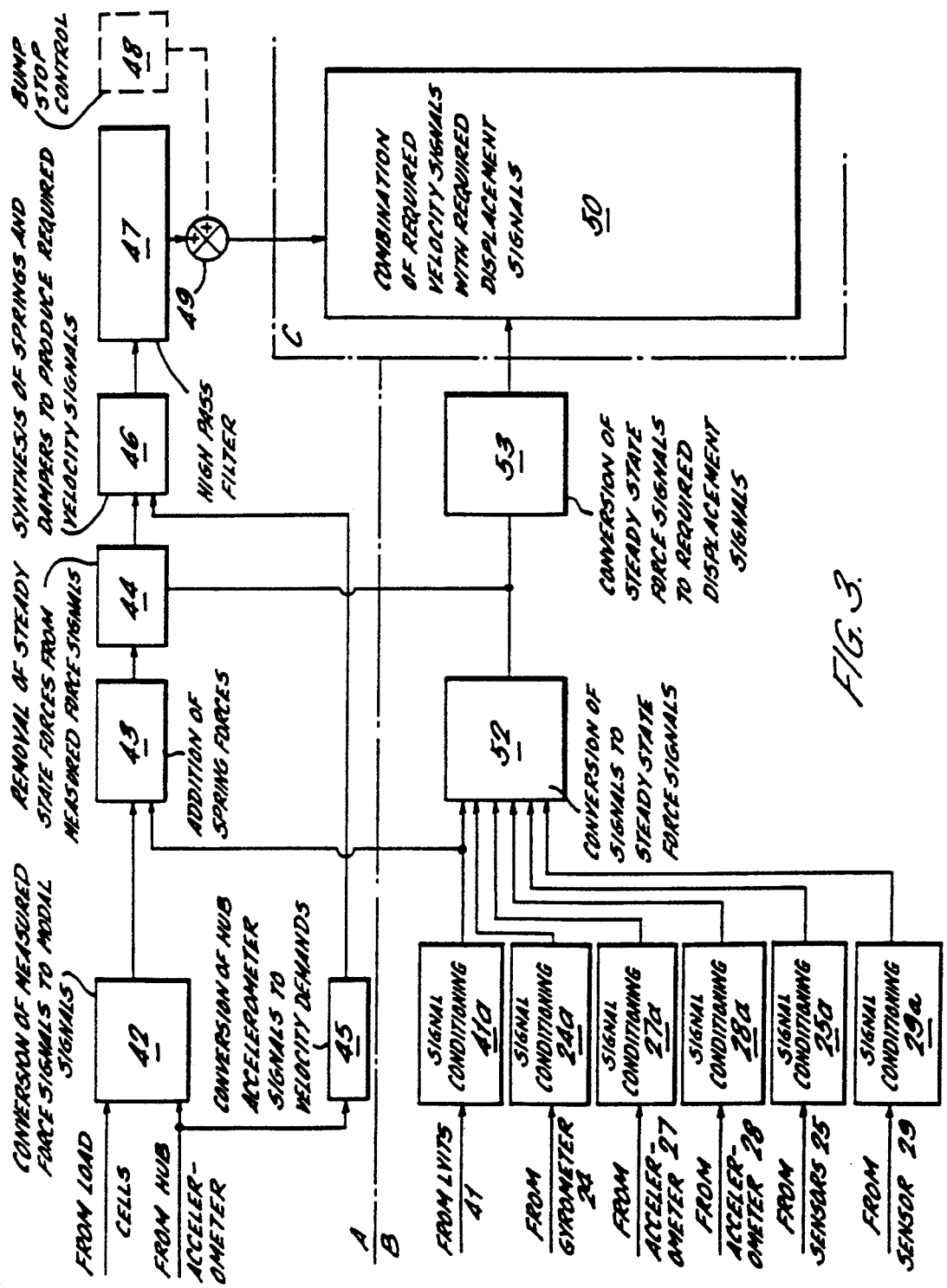
FIG. 3 is a block diagram showing the principles of operation of the control system of FIGS. 1 and 2.

Turning now to FIG. 3, there is shown a schematic block diagram of the manner in which the microprocessor 21 conditions the various signals to produce the output signals transmitted via line 34'.

In FIG. 3, a chain line divides the diagram into three portions. Portion A, occurring generally above the chain line, represents those steps concerned with dynamic forces acting on the vehicle; portion B, occurring generally below the chain line represents processing steps concerned with steady state forces acting on the vehicle; and portion C represents the final output of the microprocessor, this being a combination of the output of portions A and B.

The signals from the four load cells 22 and hub accelerometers 23 are fed into block 42 which reconfigures the dynamic force values represented by the signals as modal forces acting on the vehicle body, the modes corresponding to the four rigid body modes of displacement, i.e. the heave, pitch, roll and warp modes. The forces are calculated as being forces at the 'tire patch', that is to say the point of contact of the tire with the road. These forces are calculated as being the sum of the measured forces and the product of the masses of the unsprung masses with their respective accelerations. This sum is necessary since force in a tire at the tire patch will not all be transmitted to the body of the vehicle; a portion will accelerate the wheel and hub assembly to which the tire is attached.

In Block 43 unmeasured modal forces are added to the measured modal forces calculated in Block 42. The applicant envisages a situation wherein springs are used in parallel with the actuators in the vehicle suspension and only the force transmitted by the actuators to the body is measured. The force transmitted to the body by the springs can be calculated from measured displacements of the actuator, which are fed to the box 42 from the LVITs 41. The modal loads may also be adjusted to compensate for unmeasured loads, transmitted to the vehicle body by the suspension linkages and also components of horizontal load on the wheels transmitted through the actuator by reason of imperfection suspension arrangements.

The Block 44 removes from the modal forces calculated those forces due to the steady state inputs to the vehicle, which are calculated in Portion B, discussed below.

The corrected modal vector can be written:

$$\{Fcm\} = (Tfm) \cdot (\{Fr\} + (Mm) \cdot \{DDXu\}) +$$

-continued $$(Tin) \cdot \{\Phi e\} + (Tsp) \cdot \{Xdm\} + [Kt] \cdot \{Xx\}$$

{Fcm} is the vector of corrected modal forces
{Fr} is the vector of measured loads
{DDXu} is the vector of measured unsprung mass accelerations
{Φe} is the transpose of the vector (nx+, nx−, ny, Dr)
where
  nx is longitudinal acceleration
  ny is lateral acceleration
  Dr is yaw acceleration
{Xdm} is the vector of modal actuator displacements
{Xx} is the position offset vector
{Kt} is a diagonal matrix of tire/isolator stiffness
{Mm} is a diagonal matrix proportional to hub/wheel masses
{Tfm} is the load modal transformation matrix.
(Tin) in a matrix of constant coefficients for transforming the measured (Φe) signals to steady state modal force signals. (Tsp) is a matrix of the stiffness of springs connected in parallel with actuators of the system.

The block 46 synthesis spring and damper units and calculates modal velocity demands. The modal velocity demands are then turned into individual actuator coordinates.

The signals from accelerometers 23 are, in addition, processed in block 45 as individual hub velocity demands which are fed forwardly to block 46 for combination with the calculated corner velocity demands. The suspension simulation is further enhanced by the adding of the weighted unsprung mass inertial velocity to each actuator demand. This provides the potential for introducing inertial damping of the unsprung mass.

The output of block 46 is filtered in high pass filter block 47. This is necessary to ensure that measurement bias errors do not corrupt the simulation.

Block 48 represents an electronic bump stop control which may optionally modify the output of portion A of the program. The electronic bump stop control is disclosed in a co-pending patent application Ser. No. 07/777,215 of the applicants.

The outputs of block 47 and 48 are combined in a junction 48 and this velocity demand combined output is input to an arrangement 50 which issues electrical control signals to the actuators. A suitable arrangement is described in a co-pending application Ser. No. 07/777,215 of the applicant, but the arrangement could be of many forms well known in the prior art.

The output signals representing the steady state forces, from the LVIT 41, gyrometer 24, longitudinal accelerometer 27, lateral accelerometer 28, a vehicle speed sensor 25 and the steering angle sensor 29 are conditioned in corresponding blocks 41a, 24a, 27a, 28a, 25a and 29a to ensure conformity of signal types (i.e. to resolve the measured steady state variables into modal force values).

The outputs of these blocks are fed in to block 52, in which the steady state forces of heave, pitch, roll and warp are calculated.

The block 53 of the control system models a series of actuators, controlling the suspension of the vehicle. The steady state forces are converted in to required corner displacements, which are output to the control system 50 which in turn directly controls the actual actuators of the vehicle.

Portion B instructs the actuators to extend and contract to improve the vehicle ride and handling.

The additional motion of the actuators demanded by portion B could alter measured loads, which would, in turn, cause an unwanted reaction from the simulated suspension in portion A. However, as mentioned before, the changes in measured loads to be expected from such additional actuator motion are estimated and subtracted from the measured loads in order to eliminate the unwanted reaction from the simulated suspension of portion A.

If the displacement required of the actuators by the simulated suspension of portion A is averaged over a long period of time, then the average displacement should be zero. The portion B acts to control the average position of the actuators in order to improve the ride of the vehicle.

Theoretically, the portion B considers the four actuators connected in series to the four actuators controlled by portion A. Displacement of the theoretical actuators controlled by portion B will therefore alter the average displacement position of the combination of the two actuators. In practice, portion B of the control system varies the average position of the actual actuators used by the vehicle.

Portion B of the control system outputs a required displacement demand, whilst portion A of the control system outputs a required velocity demand. Therefore, it is necessary that one of the outputs is converted in the block 50, so that the outputs can be combined and used to control the actuators of the vehicle.

The present invention provides an active suspension control system which both controls the actuators so that road inputs are not transmitted to the vehicle and also controls the actuators so that the average displacement of each actuator can be varied to provide a better vehicle ride and performance. For instance, in the control system of the invention a vehicle body can be prevented to a large extent from rolling as the vehicle corners. The portion B of the control system of the invention acts to prevent the actuators on the side of the car on the outside of a corner from deflecting in response to the roll forces on the vehicle caused by its cornering. In fact, to compensate for any flexibility in the suspension system the actuators can be extended on roll.

Since the microprocessor splits the input signals from the sensors according to whether they represent dynamic (i.e. generally relatively high frequency) force inputs or steady state (i.e. generally relatively low frequency) force inputs, the processing of the signals can be achieved rapidly to produce combined output signals. This permits the control system of the invention to sample data at a fast rate comparable with the rate of change of the various signal values characteristic of vehicle active suspension systems, thereby permitting accurate control of the vehicle suspension system.

The applicant has envisaged a system wherein the portion A of the control system samples at a higher rate than portion B, this being advantageous in that the number of calculations required by the control system for a fixed time period is decreased. The sampling rate for portion A must be reasonably high since the said inputs will be of high frequency.

However, the sampling rate of portion B need not be so high since the frequencies of the steady state signals are generally far smaller.

What is claimed is:

1. A vehicle suspension control system comprising:
  actuator means for connection between a sprung mass of a vehicle and unsprung masses of the vehicle;
  means for determining forces acting between the sprung mass and the unsprung masses and for producing signals proportional to said forces, the means for determining forces comprising first sensor means operable to produce a first set of signals comprising signals indicative of the loads in load paths between the unsprung masses and the sprung mass and second sensor means operable to produce a second set of signals which includes signals indicative of the lateral acceleration of the vehicle, the longitudinal acceleration of the vehicle, and the yaw rate of the vehicle;
  means for processing the second set of signals to produce steady state force signals indicative of steady state input loads on the vehicle including loads arising from concerning and acceleration/deceleration of the vehicle and loads carried by the vehicle, means for combining the steady state force signals with the first set of signals to produce dynamic force signals indicative of dynamic inputs to the vehicle, the dynamic inputs including forces arising due to perturbations on a road below the vehicle;
  first means for processing the steady state force signals to produce first control signals for controlling the actuator means, whereby the first control signals act to control the actuator means to maintain the orientation of the sprung mass relative to a reference plane constant throughout vehicle cornering and acceleration/deceleration and constant with changing interior loads; and
  second means for processing the dynamic force signals to produce second control signals for controlling the actuator means, whereby the second control signals act to control the actuator means to substantially eliminate the transmission of dynamic forces from the unsprung masses to the sprung mass.

2. A control system according to claim 1 wherein the first set of signals additionally comprises signals representing the vertical accelerations of the unsprung masses.

3. A control system according to claim 1 wherein the means for processing the second set of signals to produce the steady state force signals produces steady state signals which represent a plurality of modal forces acting on the vehicle and means is provided to convert the first set of signals to modal signals before the combination of the first set of signals with the steady state force signals.

4. A control system according to claim 1 further comprising high pass filter means to filter out low frequency components of said dynamic force signals before the dynamic force signals are processed to produce the second control signals.

5. A control system according to claim 1 wherein the first means for processing the steady state force signals and the second means for processing the dynamic force signals are operating substantially simultaneously.

6. A control signal according to claim 1 wherein the first means for processing the steady state force signals and the second means for processing the dynamic force signals are constituted as a microprocessor.

7. A control system according to claim 1 wherein the first means for processing the steady state force signals produces first required displacement control signals which act to vary the average position of the actuator means.

8. A control system according to claim 1 wherein the second means for processing the dynamic force signals produces required velocity demand signals.

9. A control system according to claim 1 wherein:
   the first control signals are steady state required displacement control signals;
   the second control signals are dynamic required velocity control signals;
   means is provided to convert the steady state required displacement control signals to steady state required velocity control signals; and
   means is provided to combine the dynamic required velocity control signals with the steady state required velocity control signals.

10. A control system according to claim 1 wherein the second set of signals produced by the second sensor means includes signals indicative of the displacements of unsprung masses relative to the sprung mass.

11. A control system according to claim 1 wherein the second set of signals produced by the second sensor means includes a signal indicative of the vehicle speed.

12. A control system according to claim 1 wherein the second set of signals produced by the second sensor means includes a signal indicative of the angle at which the vehicle is steered.

* * * * *